(12) United States Patent
Ring et al.

(10) Patent No.: US 10,911,388 B2
(45) Date of Patent: Feb. 2, 2021

(54) TRANSMITTING MESSAGES

(71) Applicant: ASSA ABLOY AB, Stockholm (SE)

(72) Inventors: Carolina Ring, Stockholm (SE); Sanna Nordahl, Solna (SE); Gabriella Sanchez Karlsson, Stockholm (SE); Fredrik Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 39 days.

(21) Appl. No.: 15/578,835

(22) PCT Filed: Jun. 3, 2016

(86) PCT No.: PCT/EP2016/062691
§ 371 (c)(1),
(2) Date: Dec. 1, 2017

(87) PCT Pub. No.: WO2016/193455
PCT Pub. Date: Dec. 8, 2016

(65) Prior Publication Data
US 2018/0183745 A1 Jun. 28, 2018

(30) Foreign Application Priority Data
Jun. 4, 2015 (SE) ...................................... 1550734

(51) Int. Cl.
G06F 15/16 (2006.01)
H04L 12/58 (2006.01)
H04B 5/00 (2006.01)

(52) U.S. Cl.
CPC ............ *H04L 51/20* (2013.01); *H04B 5/0056* (2013.01)

(58) Field of Classification Search
CPC ....................................................... H04L 51/20
(Continued)

(56) References Cited

U.S. PATENT DOCUMENTS 8,369,866 B2 * 2/2013 Ashley, Jr. .............. H04L 67/18
455/456.1
9,007,212 B2 * 4/2015 Amador ............. G06K 7/10366
340/572.1
(Continued)

FOREIGN PATENT DOCUMENTS

CN 101103354 1/2008
CN 101529434 9/2009
(Continued)

OTHER PUBLICATIONS

International Search Report and Written Opinion prepared by the European Patent Office dated Aug. 30, 2016, for International Application No. PCT/EP2016/062691.

(Continued)

Primary Examiner — Duyen M Doan
(74) Attorney, Agent, or Firm — Sheridan Ross P.C.

(57) ABSTRACT

It is presented a method for transmitting a message for a recipient, the method being performed in a message transmitter of a sender, the sender being a user of the message transmitter. The method comprises the steps of: receiving user input for a new message, the new message comprising an identifier of a recipient physical space and payload data; reading a local identifier forming part of a physical device arranged at a sender physical space, the sender physical space being associated with the sender; and sending a request to a message server to transmit the new message to the recipient physical space, wherein the request comprises the new message.

13 Claims, 3 Drawing Sheets

(58) Field of Classification Search
USPC .................................................. 709/203, 206
See application file for complete search history.

(56) References Cited

U.S. PATENT DOCUMENTS

| | | | | |
|---|---|---|---|---|
| 2003/0048195 | A1* | 3/2003 | Trossen | G08B 13/2462 |
| | | | | 340/8.1 |
| 2006/0229058 | A1* | 10/2006 | Rosenberg | H04W 4/029 |
| | | | | 455/404.2 |
| 2008/0133930 | A1 | 6/2008 | Moshir et al. | |
| 2009/0157512 | A1 | 6/2009 | King | |
| 2009/0163177 | A1* | 6/2009 | Bearden | H04L 51/066 |
| | | | | 455/412.1 |
| 2013/0303085 | A1* | 11/2013 | Boucher | H04W 4/80 |
| | | | | 455/41.1 |
| 2014/0113549 | A1* | 4/2014 | Beg | H04W 4/12 |
| | | | | 455/41.1 |
| 2015/0057808 | A1 | 2/2015 | Cook et al. | |
| 2015/0120510 | A1* | 4/2015 | Kangshang | H04W 4/80 |
| | | | | 705/26.81 |
| 2015/0170448 | A1* | 6/2015 | Robfogel | G07C 9/00904 |
| | | | | 340/5.61 |

FOREIGN PATENT DOCUMENTS

| | | |
|---|---|---|
| CN | 102461096 | 5/2012 |
| CN | 103119976 | 5/2013 |
| CN | 104601449 | 5/2015 |
| JP | 2005-309528 | 11/2005 |
| JP | 2014-225262 | 12/2014 |
| WO | WO 2014/163806 | 10/2014 |

OTHER PUBLICATIONS

International Preliminary Report on Patentability prepared by the European Patent Office dated Apr. 4, 2017, for International Application No. PCT/EP2016/062691.
Official Action for Australia Patent Application No. 2016273347, dated Oct. 11, 2019, 3 pages.
Official Action with English Translation for China Patent Application No. 201680031950.8, dated Mar. 17, 2020, 13 pages.
Official Action with English Translation for Japan Patent Application No. 2017-562677, dated Feb. 25, 2020, 6 pages.
Official Action for India Patent Application No. 201717042437, dated Oct. 20, 2020, 8 pages.

* cited by examiner

TRANSMITTING MESSAGES

CROSS REFERENCE TO RELATED APPLICATIONS

This application is a national stage application under 35 U.S.C. 371 and claims the benefit of PCT Application No. PCT/EP2016/062691 having an international filing date of 3 Jun. 2016, which designated the United States, which PCT application claimed the benefit of European Patent Application No. 1550734-6 filed 4 Jun. 2015, the disclosure of each of which are incorporated herein by reference.

TECHNICAL FIELD

The invention relates to methods, a message transmitter, a message receiver, a message server, computer programs and computer program products for transmitting messages.

BACKGROUND

Electronic messaging is today one of the most common ways in which people communicate with each other. For instance, e-mail and SMS (Short Messaging Service) messages are used ubiquitously.

However, there are times where current messaging services are not ideal. For instance, students living in flats with some common area may need to communicate with each other e.g. with reference to the common area, mail deliveries, etc. However, it may not be ideal to hand out your phone number or e-mail address to everyone. Everyone may not want to distribute such personal details. Moreover, as a recipient you may not want to receive each such messages immediately. A similar situation arises in services offices or business centres, where there are several companies renting separate spaces but have some common areas.

In the prior art, post-it notes are often used for this purpose, where a message is written on a post-it note and placed on the door of the recipient. However, such a message is not secure since everyone passing by can read the message. Moreover, someone can steal or destroy the post-it note.

SUMMARY

It is an object to provide a convenient electronic messaging service which is limited to a physical space.

According to a first aspect, it is presented a method for transmitting a message for a recipient, the method being performed in a message transmitter of a sender, the sender being a user of the message transmitter. The method comprises the steps of: receiving user input for a new message, the new message comprising an identifier of a recipient physical space and payload data; reading a local identifier forming part of a physical device arranged at a sender physical space, the sender physical space being associated with the sender; and sending a request to a message server to transmit the new message to the recipient physical space, wherein the request comprises the new message.

The local identifier may be a Near Field Communication, NFC, tag.

The local identifier may form part of an electronic lock.

The step of sending a request is optionally only performed when the step of reading a local identifier is successfully performed.

According to a second aspect, it is presented a message transmitter for transmitting a message for a recipient. The message transmitter comprises: a processor; and a memory storing instructions that, when executed by the processor, causes the message transmitter to: receive user input for a new message, the new message comprising an identifier of a recipient physical space and payload data; read a local identifier forming part of a physical device arranged at a sender physical space, the sender physical space being associated with the sender; and send a request to a message server to transmit the new message to the recipient physical space, wherein the request comprises the new message.

According to a third aspect, it is presented a computer program for transmitting a message for a recipient. The computer program comprises computer program code which, when run on a message transmitter causes the message transmitter to: receive user input for a new message, the new message comprising an identifier of a recipient physical space and payload data; read a local identifier forming part of a physical device arranged at a sender physical space, the sender physical space being associated with the sender; and send a request to a message server to transmit the new message to the recipient physical space, wherein the request comprises the new message.

According to a fourth aspect, it is presented a computer program product comprising a computer program according to the third aspect and a computer readable means on which the computer program is stored.

According to a fifth aspect, it is presented method for receiving at least one message. The method is performed in a message receiver of a recipient, the recipient being a user of the message receiver. The method comprises the steps of: reading a local identifier forming part of a physical device arranged at a recipient physical space, the recipient physical space being associated with the recipient; sending a request to a message server requesting any stored messages, the request comprising an identity of the recipient and the local identifier; receiving at least one message from the message server; and presenting the at least one message to the recipient.

The local identifier may be a Near Field Communication, NFC, tag.

The local identifier may be an electronic lock.

The step of sending a request is optionally only performed when the step of reading a local identifier is successfully performed.

According to a sixth aspect, it is presented a message receiver for receiving at least one message. The message receiver comprises: a processor; and a memory storing instructions that, when executed by the processor, causes the message receiver to: read a local identifier forming part of a physical device arranged at a recipient physical space, the recipient physical space being associated with the recipient; send a request to a message server requesting any stored messages for the recipient of the message receiver when reading the local identifier; receive at least one message from the message server; and present the at least one message to the recipient.

According to a seventh aspect, it is presented a computer program for receiving at least one message. The computer program comprises computer program code which, when run on a message receiver causes the message receiver to: read a local identifier forming part of a physical device arranged at a recipient physical space, the recipient physical space being associated with the recipient; send a request to a message server requesting any stored messages for the recipient of the message receiver when reading the local identifier; receive at least one message from the message server; and present the at least one message to the recipient.

According to an eighth aspect, it is presented a computer program product comprising a computer program according to the seventh aspect and a computer readable means on which the computer program is stored.

According to a ninth aspect, it is presented a method for managing a message. The method is performed in a message server and comprises the steps of: receiving a request from a message transmitter to transmit a new message to the recipient physical space, the request comprising an identifier of a recipient physical space and payload data; storing the new message in association with the recipient physical space; receiving a request from a message receiver, the request comprising an identity of the recipient and a local identifier; and sending the new message to the message receiver when the local identifier is associated with the recipient physical space and when the recipient user is authorised to receive a message bound for the recipient physical space.

According to a tenth aspect, it is presented a message server for managing a message. The message server comprises: a processor; and a memory storing instructions that, when executed by the processor, causes the message server to: read a local identifier associated with a sender physical space associated with the sender; receive user input for a new message, the new message comprising an identifier of a recipient physical space and payload data; and send a request to a message server to transmit the new message to the recipient physical space.

According to an eleventh aspect, it is presented a computer program for managing a message. The computer program comprises computer program code which, when run on a message server causes the message server to: read a local identifier associated with a sender physical space associated with the sender; receive user input for a new message, the new message comprising an identifier of a recipient physical space and payload data; and send a request to a message server to transmit the new message to the recipient physical space.

According to a twelfth aspect, it is presented a computer program product comprising a computer program according to the eleventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
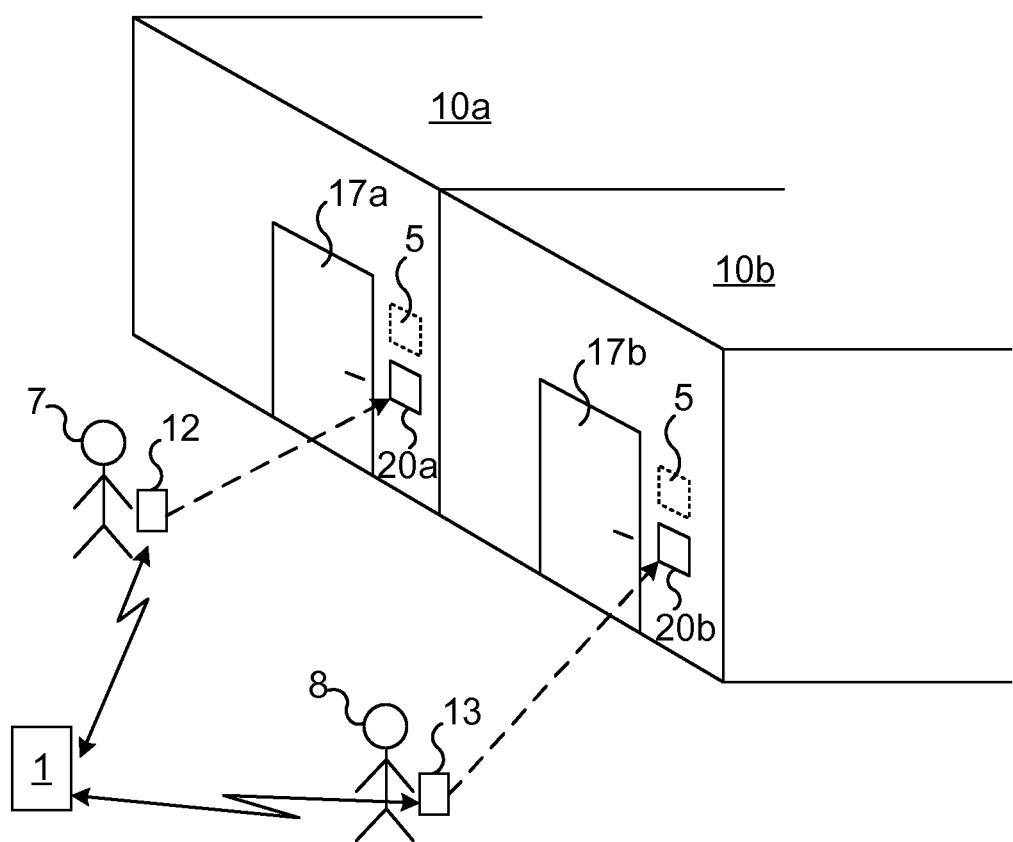
FIG. 1 is a schematic diagram illustrating an environment in which embodiments presented herein can be applied.

FIG. 1 is a schematic diagram illustrating an environment in which embodiments presented herein can be applied.

A first user is here a sender 7, who wishes to send a message to a second user being a recipient 8. The sender 7 is in possession of a message transmitter 12 and the recipient 8 is in possession of a message receiver 13.

The message transmitter 12 can e.g. be implemented using an app in a smart phone or computer program in another portable computing device. Likewise, the message receiver 13 can e.g. be implemented using an app in a smart phone or other portable computing device. A single app of a single device, such as a smart phone, can implement both the message transmitter 12 and the message receiver. However, each one of the message transmitter 12 and the message receiver are typically associated with a single user. The sender 7 can also be a recipient 8 and the recipient 8 can also be a sender 7, but for ease of explanation we here describe only one sender 7 and one recipient 8. The sender 7 is associated with a first physical space 10*a*. For instance, the sender can be a tenant for the first physical space 10*a*. The first physical space can e.g. be a residential space or commercial space, such as an office in business centre. Analogously, the receiver 8 is associated with a second physical space 10*b* which is of the same type as the first physical space.

The first physical space 10*a* and the second physical space 10*b* are both part of a defined area. The defined area can e.g. be a floor of a residential student residence or a floor of a business centre. Alternatively, the defined area can be an entire residential building or an entire business centre.

Access to the first physical space 10*a* is controlled by a first door 17*a* and a first electronic lock 20*a*. Analogously, access to the second physical space 10*b* is controlled by a second door 17*b* and a second electronic lock 20*b*.

On occasion, a person (the sender 7) needs to send a message to another person (the receiver 8). For instance, a package may have arrived for the receiver 8 when he/she was out, and the sender may have taken care of the package in the meantime.

The sender then enters the message using the user interface of the message sender. The sender then selects the recipient physical space, in this case the second physical space 10*b*, in a list of recipient physical spaces in the message transmitter 12. The list comprises identifiers of all physical spaces being part of the same area (as defined above). Optionally, a map is provided with identifiers to simplify the selection. For instance, the list can comprise a list of room numbers. In this way, the list is anonymous, which is good from a privacy/security perspective.

When the sender 7 is ready to send the message, the sender reads a local identifier which is associated with the sender's 7 physical space, in this case the first physical space 10*a*. The message is then sent to a messaging server, e.g. over an IP (Internet Protocol) network such as using WiFi or similar.

Optionally, instead of selecting the recipient physical space using the user interface, the sender goes to the physical space of the recipient and reads the local identifier which is associated with the recipient's 8 physical space, in this case the second physical space 10*b*. This requires more legwork but the sender is then not required to know the recipient's room number.

The message is stored by the message server 1 until it is ready to be received by the recipient 8.

When the recipient arrives (which can occur at any time after the message is stored by the message server 1), the message receiver 13 of the recipient 8 reads a local identifier associated with a recipient physical space associated with the recipient. In this case, the recipient 8 approaches the second electronic lock 20*b* to unlock the second door 17*b* to gain access to the second physical space 10*b*. This can e.g. occur using NFC (Near Field Communication), Bluetooth, BLE (Bluetooth Low Energy), WiFi or using a physical connection. In this way, the message receiver 13 reads the local identifier as part of unlocking the second electronic lock 20*b*.

The message receiver 13 sends a request to the message server 1 (e.g. over IP as for the transmission above) to request any stored messages for the recipient 8 of the message receiver. The request comprises an identity of the recipient 8 and the local identifier.

The message server 1 then checks a database where user identities are associated with local identifiers. If the user identity and the local identifier have such an association in the database, the message server 1 considers the request to be valid and transmits the stored message (originally from the transmitter device 12) to the message receiver 13.

In this way, a system is provided with physical limitations to sending and receiving messages. A message can only be sent when the sender 7 is by his/her physical space, and a message can only be received when the recipient 8 is by his/her physical space. Moreover, recipients are identified by physical space identifiers instead of personal identifiers. This protects privacy and anonymity and tenants do not need to give out private e-mail addresses or phone number to be contactable for building related messages.

The system thus prevents messages from reaching a recipient after the recipient has moved. This is particularly useful in messages between tenants or alternatively from a tenant (or landlord) to all tenants.

Optionally, displays 5 are provided by the doors 17*a-b* to indicate that new messages have arrived. The sender and/or receiver can then send/receive messages by reading a local identifier of the display 5.

Figure 2:
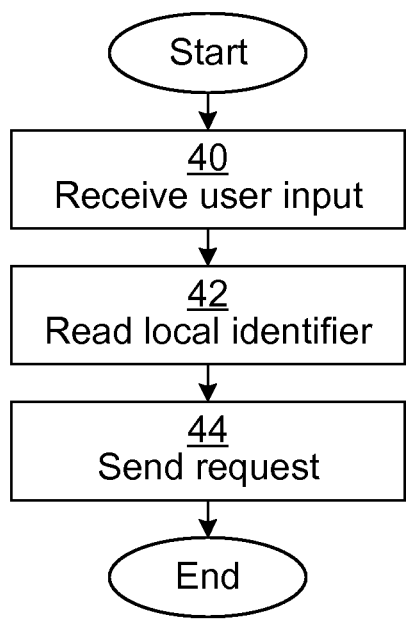
FIG. 2 is a flow chart illustrating a method for transmitting a message performed in a message transmitter.

FIG. 2 is a flow chart illustrating a method for transmitting a message performed in a message transmitter used by a sender, being a user of the message transmitter.

In a receive user input step 40, user input for a new message is received. The new message comprises an identifier of a recipient physical space and payload data.

In a read local identifier step 42, a local identifier is read. The local identifier forms part of a physical device arranged at a sender physical space. The sender physical space is associated with the sender, e.g. by the sender being a tenant of sender physical space. This implies that the sender needs to be in the vicinity of the sender physical space.

As explained above, the local identifier can be a physical identifier such as a Near Field Communication, NFC, tag or a barcode (one dimensional or two dimensional). In one embodiment, the local identifier forms part of an electronic lock. In this way, the transmission of the message occurs as long as the sender is close enough to be in (local) communication with the local identifier.

It is to be noted that steps 40 and 42 can be performed in the reverse order from what is shown in FIG. 2.

In a send request step 44, a request is sent to a message server to transmit the new message to the recipient physical space. The request comprises the new message. This step is only performed when the message transmitter is close enough to the local identifier so that step 42 can be performed.

Figure 3:
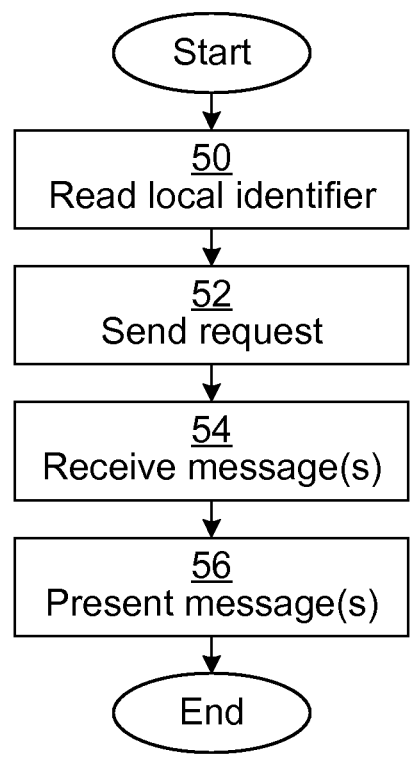
FIG. 3 is a flow chart illustrating a method for receiving at least one message, the method being performed in a message receiver.

FIG. 3 is a flow chart illustrating a method for receiving at least one message, the method being performed in a message receiver.

In a read local identifier step 50, a local identifier is read. The local identifier forms part of a physical device arranged at a recipient physical space. The recipient physical space is associated with the recipient, e.g. by the recipient being a tenant of sender physical space. This implies that the receiver needs to be in the vicinity of the receiver physical space.

In a send request step 52, a request is sent to a message server. The request comprises an identity of the recipient and the local identifier. This step is only performed when the message transmitter is close enough to the local identifier so that step 50 can be performed.

As explained above, the local identifier is a Near Field Communication, NFC, tag. In one embodiment, the local identifier forms part of an electronic lock. In this way, the transmission of the message occurs as long as the message receiver is close enough to be in communication with the local identifier.

In a receive message(s) step 54, at least one message is received from the message server.

In a present message(s) step 56, the at least one message is presented to the recipient. This can e.g. comprise presenting the messages on a display of the message receiver or using a speaker.

Figure 4:
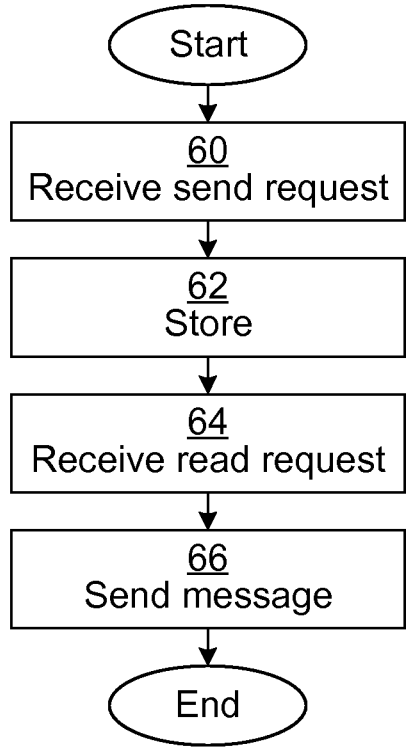
FIG. 4 is a flow chart illustrating a method for managing a message, the method being performed in a message server.

FIG. 4 is a flow chart illustrating a method for managing a message, the method being performed in a message server.

In a receive send request step 60, a request is received from a message transmitter to transmit a new message to the recipient physical space. The request comprises an identifier of a recipient physical space and payload data.

In a store step 62, the new message is stored in association with the recipient physical space.

In a receive read request step 64, a request is received from a message receiver. The request comprises an identity of the recipient and a local identifier associated with the recipient.

In a send message step 66, the new message is sent to the message receiver when the local identifier is associated with the recipient physical space and when the recipient user is authorised to receive a message bound for the recipient physical space.

Figure 5:
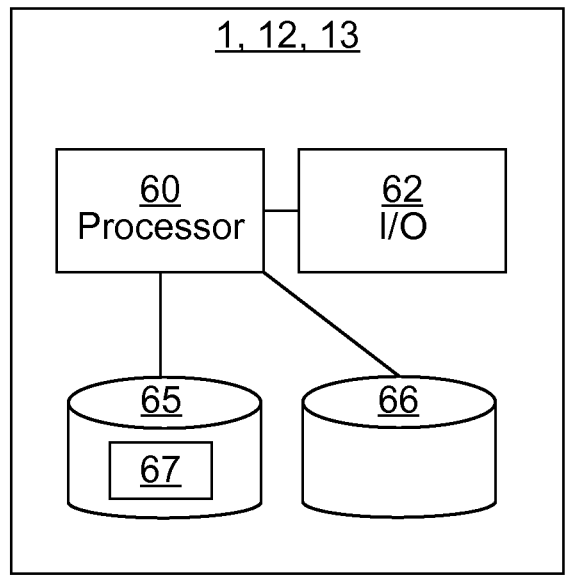
FIG. 5 is a schematic diagram showing some components of each one of the message transmitter, the message receive and the message server of FIG. 1.

FIG. 5 is a schematic diagram showing some components of each one of the message transmitter, the message receiver and the message server of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the methods described with reference to FIGS. 2-4 above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

An I/O interface 62 for communicating with other external entities. Optionally, the I/O interface 62 also includes a user interface.

Other components of the devices 1, 12, 13 are omitted in order not to obscure the concepts presented herein.

Figure 6:
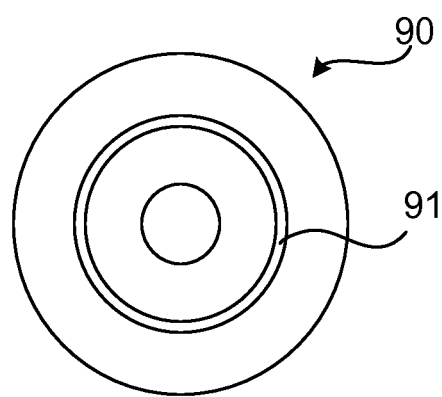
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for transmitting a message for a recipient (8), the method being performed in a message transmitter (12) of a sender (7), the sender being a user of the message transmitter (12), the method comprising the steps of:
receiving (40) user input for a new message, the new message comprising an identifier of a recipient physical space and payload data;
reading (42) a local identifier (3) associated with a sender physical space (10a) associated with the sender (7); and
sending (44) a request to a message server (1) to transmit the new message to the recipient physical space.

ii. The method according to embodiment i, wherein the local identifier is a Near Field Communication, NFC, tag.

iii. The method according to embodiment i or ii, wherein the local identifier is an electronic lock.

iv. A message transmitter (12) for transmitting a message for a recipient (8), the message transmitter (12) comprising:
a processor (60); and
a memory (64) storing instructions (66) that, when executed by the processor, causes the message transmitter (12) to:
receive user input for a new message, the new message comprising an identifier of a recipient physical space and payload data;
read a local identifier (3) associated with a sender physical space (10a) associated with the sender (7); and
send a request to a message server (1) to transmit the new message to the recipient physical space.

v. A computer program (90) for transmitting a message for a recipient (8), the computer program comprising computer program code which, when run on a message transmitter (12) causes the message transmitter (12) to:
receive user input for a new message, the new message comprising an identifier of a recipient physical space and payload data;
read a local identifier (3) associated with a sender physical space (10a) associated with the sender (7); and
send a request to a message server (1) to transmit the new message to the recipient physical space.

vi. A computer program product (91) comprising a computer program according to embodiment v and a computer readable means on which the computer program is stored.

vii. A method for receiving at least one message, the method being performed in a message receiver (13) of a recipient (8), the recipient being a user of the message receiver (13), the method comprising the steps of:
reading (50) a local identifier associated with a recipient physical space (10b) associated with the recipient (8);
sending (52) a request to a message server (1) requesting any stored messages, the request comprising an identity of the recipient (8) and the local identifier (3);
receiving (54) at least one message from the message server (1); and
presenting (56) the at least one message to the recipient (8).

viii. The method according to embodiment vii, wherein the local identifier is a Near Field Communication, NFC, tag.

ix. The method according to embodiment vii or viii, wherein the local identifier is an electronic lock (20b).

x. A message receiver (13) for receiving at least one message, the message receiver comprising:
a processor (60); and
a memory (64) storing instructions (66) that, when executed by the processor, causes the message receiver (13) to:
read a local identifier associated with a recipient physical space (10b) associated with the recipient (8);
send a request to a message server (1) requesting any stored messages for the recipient (8) of the message receiver when reading the local identifier (3);
receive at least one message from the message server (1); and
present the at least one message to the recipient (8).

xi. A computer program (91) for receiving at least one message, the computer program comprising computer program code which, when run on a message receiver (13) causes the message receiver (13) to:
read a local identifier associated with a recipient physical space (10b) associated with the recipient (8);
send a request to a message server (1) requesting any stored messages for the recipient (8) of the message receiver when reading the local identifier (3);
receive at least one message from the message server (1); and
present the at least one message to the recipient (8).

xii. A computer program product (90) comprising a computer program according to embodiment xi and a computer readable means on which the computer program is stored.

xiii. A method for managing a message, the method being performed in a message server (1) and comprising the steps of:
receiving (60) a request from a message transmitter (12) to transmit a new message to the recipient physical space, the request comprising an identifier of a recipient physical space and payload data;

storing (62) the new message in association with the recipient physical space;

receiving (64) a request from a message receiver (13), the request comprising an identity of the recipient (8) and a local identifier (3); and sending (66) the new message to the message receiver (13) when the local identifier (3) is associated with the recipient physical space and when the recipient user is authorised to receive a message bound for the recipient physical space.

xiv. A message server (1) for managing a message, the message server (1) comprising:

a processor (60); and a memory (64) storing instructions (66) that, when executed by the processor, causes the message server (1) to:

read a local identifier (3) associated with a sender physical space (10a) associated with the sender (7);

receive user input for a new message, the new message comprising an identifier of a recipient physical space and payload data; and send a request to a message server (1) to transmit the new message to the recipient physical space.

xv. A computer program (91) for managing a message, the computer program comprising computer program code which, when run on a message server (1) causes the message server (1) to:

read a local identifier (3) associated with a sender physical space (10a) associated with the sender (7);

receive user input for a new message, the new message comprising an identifier of a recipient physical space and payload data; and send a request to a message server (1) to transmit the new message to the recipient physical space.

xvi. A computer program product (91) comprising a computer program according to embodiment xv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for transmitting a message for a recipient, the method being performed in a message transmitter of a sender, the sender being a user of the message transmitter, the method comprising:

receiving user input for a new message, the new message comprising an identifier of a recipient physical space and payload data;

in response to receiving the user input, reading a local identifier forming part of a physical device arranged at a sender physical space, the sender physical space being associated with the sender, wherein the local identifier forms part of an electronic lock; and sending a request to a message server to transmit the new message to the recipient physical space, wherein the request comprises the new message comprising the identifier of the recipient of the physical space and the payload data.

2. The method according to claim 1, wherein the local identifier is a Near Field Communication, NFC, tag.

3. The method according to claim 1, wherein the step of sending a request is only performed when the step of reading a local identifier is successfully performed.

4. A message transmitter for transmitting a message for a recipient, the message transmitter comprising:

a processor; and a memory storing instructions that, when executed by the processor, causes the message transmitter to:

receive user input for a new message, the new message comprising an identifier of a recipient physical space and payload data;

read a local identifier forming part of a physical device arranged at a sender physical space, the sender physical space being associated with the sender, wherein the local identifier forms part of an electronic lock; and send a request to a message server to transmit the new message to the recipient physical space, wherein the request comprises the new message comprising the identifier of the recipient of the physical space and the payload data.

5. A non-transitory computer-readable medium comprising a computer program stored thereon for transmitting a message for a recipient, the computer program comprising computer program code which, when run on a message transmitter causes the message transmitter to:

receive user input for a new message, the new message comprising an identifier of a recipient physical space and payload data;

read a local identifier forming part of a physical device arranged at a sender physical space, the sender physical space being associated with the sender, wherein the local identifier forms part of an electronic lock; and send a request to a message server to transmit the new message to the recipient physical space, wherein the request comprises the new message comprising the identifier of the recipient of the physical space and the payload data.

6. A method for receiving at least one message, the method being performed in a message receiver of a recipient, the recipient being a user of the message receiver, the method comprising the steps of:

reading a local identifier forming part of a physical device arranged at a recipient physical space, the recipient physical space being associated with the recipient, wherein the local identifier forms part of an electronic lock;

sending a request to a message server requesting any stored messages, the request comprising an identity of the recipient and the local identifier;

receiving at least one message from the message server; and presenting the at least one message to the recipient.

7. The method according to claim 6, wherein the local identifier is a Near Field Communication, NFC, tag.

8. The method according to claim 6, wherein the step of sending a request is only performed when the step of reading a local identifier is successfully performed.

9. A message receiver for receiving at least one message, the message receiver comprising:

a processor; and a memory storing instructions that, when executed by the processor, causes the message receiver to:

read a local identifier forming part of a physical device arranged at a recipient physical space, the recipient physical space being associated with the recipient, wherein the local identifier forms part of an electronic lock;

send a request to a message server requesting any stored messages for the recipient of the message receiver when reading the local identifier;

receive at least one message from the message server; and
present the at least one message to the recipient.

10. A non-transitory computer-readable medium comprising a computer program stored thereon for receiving at least one message, the computer program comprising computer program code which, when run on a message receiver causes the message receiver to:
 read a local identifier forming part of a physical device arranged at a recipient physical space, the recipient physical space being associated with the recipient, wherein the local identifier forms part of an electronic lock;
 send a request to a message server requesting any stored messages for the recipient of the message receiver when reading the local identifier;
 receive at least one message from the message server; and
 present the at least one message to the recipient.

11. A method for managing a message, the method being performed in a message server and comprising the steps of:
 receiving a request from a message transmitter to transmit a new message to the recipient physical space, the request comprising an identifier of a recipient physical space and payload data;
 storing the new message in association with the recipient physical space;
 receiving a request from a message receiver, the request comprising an identity of the recipient and a local identifier, wherein the local identifier forms part of an electronic lock; and
 sending the new message to the message receiver when the local identifier is associated with the recipient physical space and when the recipient user is authorized to receive a message bound for the recipient physical space.

12. A message server for managing a message, the message server comprising:
 a processor; and
 a memory storing instructions that, when executed by the processor, causes the message server to:
  receive a request from a message transmitter to transmit a new message to the recipient physical space, the request comprising an identifier of a recipient physical space and payload data;
  store the new message in association with the recipient physical space;
  receive a request from a message receiver, the request comprising an identity of the recipient and a local identifier, wherein the local identifier forms part of an electronic lock; and
  send the new message to the message receiver when the local identifier is associated with the recipient physical space and when the recipient user is authorized to receive a message bound for the recipient physical space.

13. A non-transitory computer-readable medium comprising a computer program stored thereon for managing a message, the computer program comprising computer program code which, when run on a message server causes the message server to:
 receive a request from a message transmitter to transmit a new message to the recipient physical space, the request comprising an identifier of a recipient physical space and payload data;
 store the new message in association with the recipient physical space;
 receive a request from a message receiver, the request comprising an identity of the recipient and a local identifier, wherein the local identifier forms part of an electronic lock; and
 send the new message to the message receiver when the local identifier is associated with the recipient physical space and when the recipient user is authorized to receive a message bound for the recipient physical space.

* * * * *